US007003036B2

(12) United States Patent
Sugiyama

(10) Patent No.: US 7,003,036 B2
(45) Date of Patent: Feb. 21, 2006

(54) ENCODER, DECODER, ENCODING METHOD AND DECODING METHOD FOR COLOR MOVING IMAGE AND METHOD OF TRANSFERRING BITSTREAM OF COLOR MOVING IMAGE

(75) Inventor: Kenji Sugiyama, Yokosuka (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 624 days.

(21) Appl. No.: 10/287,685

(22) Filed: Nov. 5, 2002

(65) Prior Publication Data

US 2003/0103562 A1 Jun. 5, 2003

(30) Foreign Application Priority Data

Nov. 30, 2001 (JP) ............................ 2001-365812

(51) Int. Cl.
*H04N 7/12* (2006.01)
*H04N 11/02* (2006.01)
*H04N 11/04* (2006.01)
*H04B 1/66* (2006.01)

(52) U.S. Cl. ................................................ 375/240.12

(58) Field of Classification Search ........... 375/240.01, 375/240.02, 240.12, 240.13, 240.26; 348/453, 348/458, 452; H04N 7/12, 11/02, 11/04; H04B 1/66
See application file for complete search history.

(56) References Cited

U.S. PATENT DOCUMENTS

| | | | | |
|---|---|---|---|---|
| 6,219,103 | B1 * | 4/2001 | Sugiyama | 348/452 |
| 6,421,385 | B1 * | 7/2002 | Uenoyama et al. | 375/240.2 |
| 6,490,321 | B1 * | 12/2002 | Sugiyama | 375/240.13 |
| 6,940,911 | B1 * | 9/2005 | Sugiyama | 375/240.26 |
| 2004/0101049 | A1 * | 5/2004 | Sugiyama | 375/240.12 |

FOREIGN PATENT DOCUMENTS

| | | |
|---|---|---|
| JP | 11-046365 | 2/1999 |
| JP | 11-275591 | 10/1999 |

* cited by examiner

*Primary Examiner*—Tung Vo
(74) *Attorney, Agent, or Firm*—Jacobson Holman PLLC

(57) ABSTRACT

A luminance signal of each of first pictures to be used as reference pictures in inter-picture predictive encoding is encoded into a progressive moving-image signal whereas color-difference signals of each first picture are encoded into first moving-image signals having scanning lines decimated to one-half of scanning lines of the progressive moving-image signal. On the contrary, a luminance signal and also color-difference signals of second pictures not to be used as reference pictures in inter-picture predictive encoding are encoded into second moving-image signals having scanning lines decimated to one-half of the scanning lines of the progressive moving-image signal. The progressive moving-image signal and the first and second moving-image signals are combined into a color moving-image bitstream.

7 Claims, 6 Drawing Sheets

ENCODER, DECODER, ENCODING METHOD AND DECODING METHOD FOR COLOR MOVING IMAGE AND METHOD OF TRANSFERRING BITSTREAM OF COLOR MOVING IMAGE

BACKGROUND OF THE INVENTION

The present invention relates to an encoder, a decoder, an encoding method and a decoding method for color moving images and also a method of transferring bitstreams of color moving images.

More specifically, this invention relates to an encoder, a decoder, an encoding method and a decoding method for color moving images and also a method of transferring bitstreams of color moving images with encoding or decoding processing in an image format with decreased number of pixels (or scanning lines) in a spatially vertical direction for color-difference signals in moving-image encoding including intra-picture encoding, predictive encoding and bidirectionally predictive encoding.

Color moving-picture encoding generally processes component signals of a luminance signal and two color-difference signals in formats of images to be encoded.

The image formats are classified into the following three types: 4:2:2 format (the number of sampled color-difference signals one-half the luminance signal in a spatially horizontal direction; 4:1:1 format (the number of sampled color-difference signals one-fourth the luminance signal in the horizontal direction; and 4:2:0 format (the number of sampled color-difference signals one-half the luminance signal in the horizontal and vertical directions).

In MPEG-2 (Moving Picture Experts Group 2) standard, the 4:2:2 format has been used in encoding called 4:2:2 profile for broadcasting equipment whereas the 4:2:0 format in encoding called main profile for digital broadcasting equipment and household electronic equipment.

In each of the 4:2:2, 4:1:1 and 4:2:0 formats, the second and the third numbers indicate sampling frequencies for the color-difference signal components to 4 (the sampling number for the luminance signal at 13.5 MHz) or the ratio of two color-difference signals to the luminance signal is 2 (or 1):4.

The 4:2:0 format is not officially defined by International Telecommunication Union (ITU), in which the number of each sampled color-difference signal is one-half the luminance signal in the horizontal (the same as 4:2:2) and vertical directions.

The number of scanning lines (pixels in the vertical direction) is made one-half in the 4:2:0 format per frame to the 4:2:2 format for progressive moving-image signals. The resolution of the color-difference signals in the 4:2:0 format is thus ½ to the 4:2:2 format in both vertical and horizontal directions.

This signal resolution property in the 4:2:0 format is feasible for human visual property. Moreover, the amount of data to be processed is lightened in the 4:2:0 format. Therefore, the 4:2:0 format is the best choice for efficient encoding to progressive images.

Two sampling points have been defined for the color-difference signals: the same locations as the luminance signal, for interlaced color-difference signals in SMPTE294M standard; and the points each corresponding to the middle point between sampling points for the luminance signal, for progressive color-difference signals in MPEG-2 standard.

Nevertheless, the 4:2:0 format suffers reduction of scanning lines (the number of pixels in the vertical direction) of color-difference signals to one-half per field for interlaced moving-image signals, which results in decrease in resolution of color-difference signal in the vertical direction to one-fourth.

Illustrated in FIGS. 1A and 1B are ITU-defined 4:2:2-format sampling points and MPEG-defined 4:2:0-format sampling points, respectively, with symbols "○" and "x" indicating luminance-signal sampling points and color-difference signal sampling points, respectively, in the vertical direction V on the time base T.

In interlaced scanning, the 4:2:2 format is a better choice for high resolution whereas the 4:2:0 format is good for less processing amount. The 4:2:0 format carries less amount of data than the 4:2:2 format, however, not so feasible due to imbalance between the amount of data and low resolution.

Luminance and color-difference signals are sampled per block of pixels in efficient encoding for motion compensation and orthogonal transform per block of pixels.

One block usually consists of (8×8) pixels, the unit of processing in orthogonal transform, in a luminance signal of (16×16) pixels, the unit of processing (macroblock) in motion compensation and adaptive-mode switching.

The 4:2:2 format has two blocks for each color-difference signal to four blocks of a luminance signal whereas the 4:2:0 format has one block for each color-difference signal to four luminance-signal blocks.

Moving-image encoding techniques, such as MPEG, process three types of pictures: I-pictures (intra-coded pictures); P-pictures (predictive-coded pictures) and B-pictures (bidirectionally predictive-coded pictures).

As one of such moving-image encoding techniques, the inventor of the present application has already invented a moving-image encoding technique disclosed in Japanese Unexamined Patent Publication Nos. 11-275591/1999 and 11-46365/1999 in which P(I)-pictures to be used as the reference pictures in inter-picture predictive encoding undergo progressive scanning whereas B-pictures not to be used as the reference pictures undergo interlaced scanning.

This moving-image encoding technique achieves high inter-picture prediction efficiency with no redundant scanning-line encoding for interlaced-scanning reproduction.

Explained below is such encoding technique with progressive scanning for P(I)-pictures and interlaced scanning for B-pictures.

An input progressive moving-image signal is separated into signal components to be encoded as P(I)-pictures and other signal components to be encoded as B-pictures.

Each P(I)-picture signal component undergoes subtraction with a predictive signal obtained through inter-picture prediction, thus a predictive error signal being produced.

The predictive error signal undergoes (8×8)-DCT (Discrete Cosine Transform) processing, and thus transformed into coefficients. The coefficients are quantized at a given step width to become fixed-length codes.

The fixed-length codes undergo inverse quantization and (8×8)-IDCT, the inverse processing of (8×8)-DCT and quantization disclosed above, thus the predictive error signal being reproduced.

The reproduced predictive error signal is added to a predictive signal, thus a local image being reproduced. The reproduced image undergoes inter-picture prediction, as a reference picture, thus a predictive signal being generated for the subtraction and addition described above.

Each progressive B-picture signal component is delayed per frame while P(I)-pictures are encoded precedingly. The delayed signal component undergoes subtraction with the predictive signal obtained through the inter-picture prediction. Scanning lines of the resultant progressive predictive error signal are decimated, thus the predictive error signal being converted into an interlaced predictive error signal.

The interlaced predictive error signal undergoes (8×4)-DCT processing per four scanning lines in the vertical direction. The resultant coefficients are quantized at a given step width to become fixed-length codes.

The fixed-length codes (predictive error signal) of P (I)-pictures and B-pictures are compressed with variable-length codes, and thus converted into a bitstream.

The 4:2:2-format sampling points under the encoding procedure described above are illustrated in FIG. 1C with symbols "○" and "x" indicating luminance-signal sampling points and color-difference signals sampling points, respectively, in the vertical direction V on the time base T.

The encoding technique with progressive scanning for P (I)-pictures and interlaced scanning for B-pictures described above for 4:2:0-format color moving-image signals offers an appropriate resolution to progressive I-and P-pictures when processing the color-difference signals the same as the luminance signal like MPEG-2 standard.

Nevertheless, the encoding technique suffers insufficient resolution in the vertical direction for interlaced color-difference signal of B-pictures decimated per field when handling the color-difference signals the same as the luminance signal like MPEG-2 standard.

Moreover, this encoding technique suffers increase in processing amount for 4:2:2-format color moving-image signals compared to 4:4:0-format processing, and requiring large amount of data to subjective picture quality, due to excessive resolution of color-difference signals compared to luminance signal under progressive scanning.

SUMMARY OF THE INVENTION

A purpose of the present invention is to provide an encoder, a decoder, an encoding method and a decoding method for color moving images and also a method of transferring bitstreams of color moving images, with excellent resolution of color-difference signals.

The present invention provides a color moving-image encoding apparatus for generating a color moving-image bitstream having first pictures used as reference pictures and second pictures not used as reference pictures in inter-picture predictive encoding, the apparatus including: a first encoder to encode a luminance signal of each first picture into a progressive moving-image signal whereas encode color-difference signals of the first picture into first moving-image signals having scanning lines decimated to one-half of scanning lines of the progressive moving-image signal; and a second encoder to encode a luminance signal and also color-difference signals of the second picture into second moving-image signals having scanning lines decimated to one-half of the scanning lines of the progressive moving-image signal.

Moreover, the present invention provides a color moving-image decoding apparatus for decoding a color moving-image bitstream having first pictures used as reference pictures and second pictures not used as reference pictures in inter-picture predictive encoding, the apparatus including: a first decoder to decode a luminance signal of each first picture into a progressive moving-image signal whereas decode color-difference signals of the first picture into first moving-image signals having scanning lines decimated to one-half of scanning lines of the progressive moving-image signal; and a second encoder to encode a luminance signal and also color-difference signals of the second picture into second moving-image signals having scanning lines decimated to one-half of the scanning lines of the progressive moving-image signal.

Furthermore, the present invention provides a color moving-image encoding method of generating a color moving-image bitstream having first pictures used as reference pictures and second pictures not used as reference pictures in inter-picture predictive encoding, including the steps of: encoding a luminance signal of each first picture into a progressive moving-image signal whereas encoding color-difference signals of the first picture into first moving-image signals having scanning lines decimated to one-half of scanning lines of the progressive moving-image signal; and encoding a luminance signal and also color-difference signals of the second picture into second moving-image signals having scanning lines decimated to one-half of the scanning lines of the progressive moving-image signal.

Moreover, the present invention provides a color moving-image decoding method of decoding a color moving-image bitstream having first pictures used as reference pictures and second pictures not used as reference pictures in inter-picture predictive encoding, including the steps of: decoding a luminance signal of each first picture into a progressive moving-image signal whereas decoding color-difference signals of the first picture into first moving-image signals having scanning lines decimated to one-half of scanning lines of the progressive moving-image signal; and encoding a luminance signal and also color-difference signals of the second picture into second moving-image signals having scanning lines decimated to one-half of the scanning lines of the progressive moving-image signal.

Furthermore, the present invention provides a method of transferring a color moving-image bitstream having first pictures used as reference pictures and second pictures not used as reference pictures in inter-picture predictive encoding, including the step of transferring the color moving-image bitstream carrying first moving-image signals of a luminance signal of each first picture encoded into a progressive moving image signal and color-difference signals of the first picture encoded into first moving-image signals having scanning lines decimated to one-half of scanning lines of the progressive moving-image signal in a spatially vertical direction and also carrying first moving-image signals of a luminance signal and color-difference signals of the second picture encoded into second moving-image signals having scanning lines decimated to one-half of the scanning lines of the progressive moving image signal.

DETAILED DESCRIPTION OF PREFERRED EMBODIMENTS

Preferred embodiments according to the present invention will be described in detail with reference to the attached drawings. The term "picture" means a frame or a field in the following disclosures.

[First Embodiment of Encoder]

Figure 1A:
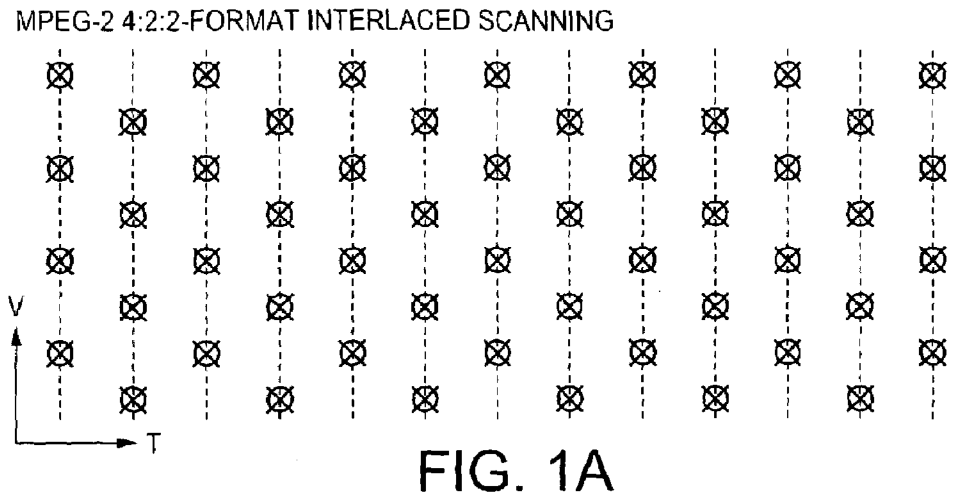
FIGS. 1A, 1B and 1C illustrate scanning-line structures in known encoding techniques.
Figure 1B:
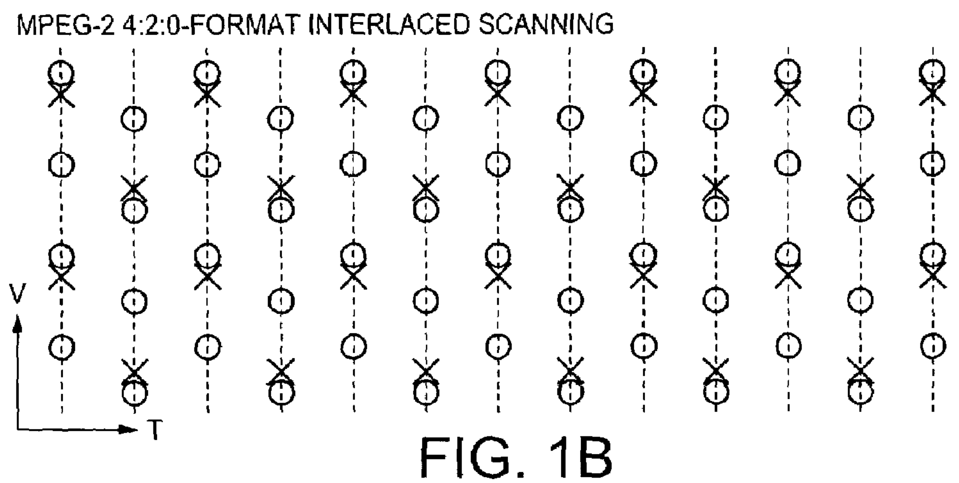
Figure 1C:
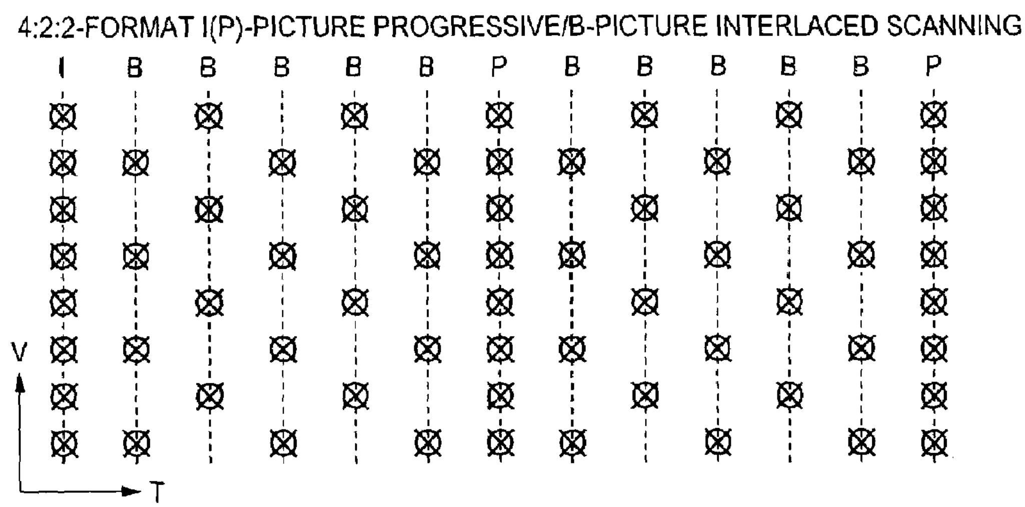
Figure 2:
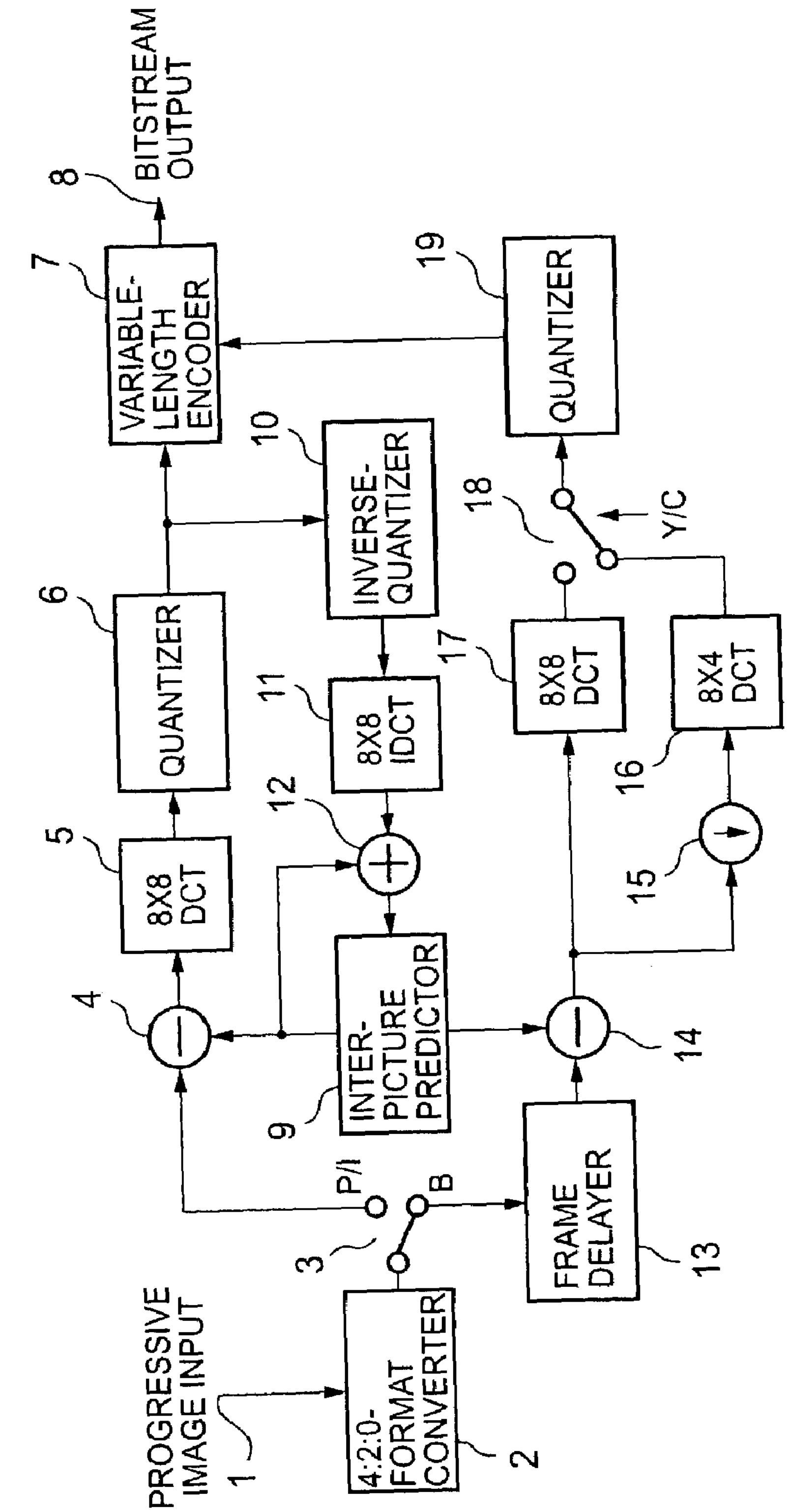
FIG. 2 shows a block diagram of a first embodiment of color moving-image encoder according to the present invention.

FIG. 2 shows a block diagram of the first embodiment of color moving-image encoder.

A progressive 4:4:2-format color moving-image signal supplied through a progressive-image input terminal 1 is supplied to a 4:2:0-format converter 2. The color-difference signal components of the 4:4:2-format signal undergo sub-sampling in the vertical direction for all pictures, thus the 4:4:2-format signal being converted into a 4:2:0-format color moving-image signal and supplied to a switch 3.

The sampling points for the color-difference signal components in the 4:2:0-format conversion are set in accordance with the MPEG-2 standard.

The standard number of pixels (scanning lines) in the 4:4:2 format is 720 (480) for luminance signal and 360 (480) for color difference signal whereas 720 (480) for luminance signal and 360 (240) for color difference signal in the 4:2:0 format.

The 4:2:0-format color moving-image signal supplied to the switch 3 is separated into signal components to be encoded as P(I)-pictures and other signal components to be encoded as B-pictures.

The signal components to be encoded as P(I)-pictures are supplied to a subtractor 4 whereas the other signal components to be encoded as B-pictures to a frame (or field) delayer 13.

Each P(I)-picture signal component supplied to the subtractor 4 undergoes subtraction with a predictive signal supplied from an inter-picture predictor 9, the resultant predictive error signal being supplied to a (8×8)-DCT 5.

The predictive error signal undergoes DCT (Discrete Cosine Transform) processing, the resultant coefficients being supplied to a quantizer 6. The coefficients are quantized at a given step width to become fixed-length codes. The fixed-length codes of coefficients are supplied to a variable-length encoder 7 and an inverse quantizer 10.

The fixed-length codes supplied to the inverse quantizer 10 and further to a (8×8)-IDCT 11 undergo processing the inverse of those in the quantizer 6 and the (8×8)-DCT 5, thus the predictive error signal being reproduced.

The reproduced predictive error signal is supplied to an adder 12 and added to a predictive signal, thus a picture (local image) being reproduced. The reproduced picture is supplied to the inter-picture predictor 9, as a reference picture, thus a predictive signal being generated and supplied to the subtractor 4, the adder 12 and also a subtractor 14.

Through these processing, the P(I)-pictures are 4:2:0-format progressive signals, and hence the reproduced local image and predictive signal are also 4:2:0-format progressive signals.

The progressive B-picture signal components supplied to the frame delayer 13 are delayed while the P(I)-pictures are encoded precedingly. Each delayed signal component is supplied to the subtractor 14 and undergoes subtraction with the predictive signal from the inter-picture predictor 9. The resultant progressive predictive error signal is supplied to a scanning-line decimator 15 and a (8×8)-DCT 17.

The (8×8)-DCT 17 applies the DCT processing to the predictive error signal, the same as the (8×8)-DCT 5, the resultant coefficients being supplied to a switch 18.

Scanning lines of the progressive predictive error signal are decimated by the scanning-line decimator 15, thus the predictive error signal being converted into an interlaced predictive error signal.

The interlaced predictive error signal is supplied to a (8×4)-DCT 16 and undergoes DCT processing per four scanning lines in the vertical direction. The resultant coefficients are supplied to the switch 18.

The switch 18 selects the scanning-line-decimated coefficients from the (8×4)-DCT 16 for the luminance signal whereas the coefficients from the (8×8)-DCT 17 for the color-difference signals.

The selected coefficients are supplied to a quantizer 19. The coefficients are quantized at a given step width to become fixed-length codes. The fixed-length codes of coefficients are supplied to the variable-length encoder 7.

The fixed-length codes (predictive error signals) from the quantizers 6 and 19 are compressed by the variable-length encoder 7 with variable-length codes, the resultant bitstream being output (transferred) through a bitstream output terminal 8.

Figure 6A:
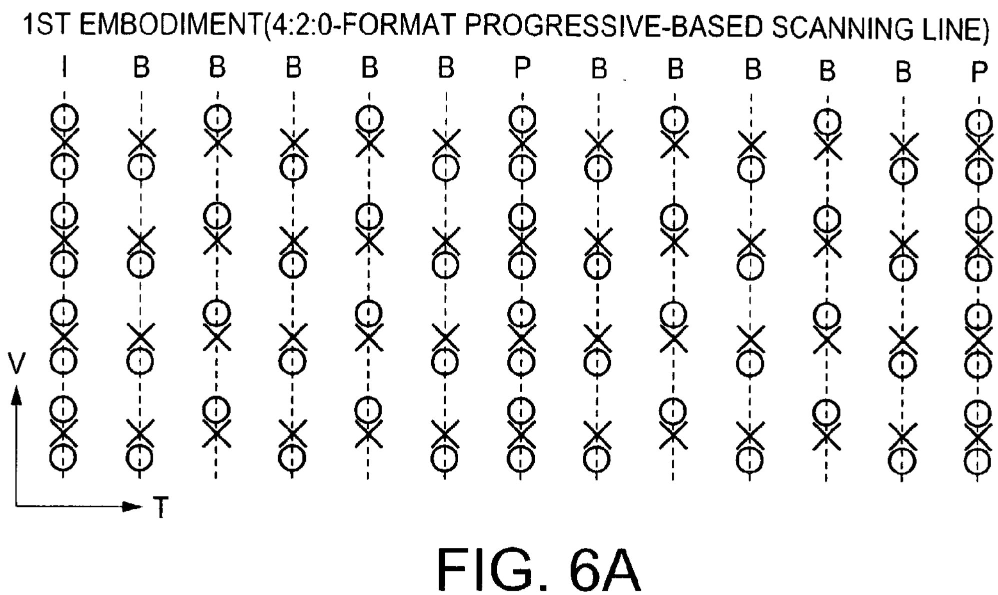
FIGS. 6A and 6B illustrate scanning-line structures in the first and the second embodiments, respectively.

FIG. 6A illustrates the sampling points under the encoding procedure in the first embodiment described above with symbols "○" and "x" indicating luminance-signal sampling points and color-difference-signal sampling points, respectively, in the vertical direction V on the time base T.

P(I)-pictures are formed into the progressing 4:2:0-format signals whereas B-pictures undergo decimation by interlaced scanning only for the luminance signal. The number of scanning lines is the same whereas the sampling points are different between the luminance and color-difference signals for B-pictures.

As disclosed above, P(I)-pictures used as reference pictures are encoded in progressive 4:2:0 format in the first embodiment. The number of sampled color-difference signals is thus one-half the luminance signal in both vertical and horizontal directions. Hence, the first embodiment achieves high efficiency in visual characteristics, processing amount and data amount.

B-pictures are encoded in progressive 4:2:0 format for color-difference signals whereas interlaced 4:2:0 format for luminance signal in the first embodiment. The number of scanning lines of luminance and color-difference signals is thus one-half the input progressive 4:2:2 format signals. Hence, the first embodiment achieves almost no decrease in resolution of color-difference signal for interlaced-scanning reproduction, thus feasible in visual characteristics, processing amount and data amount.

The first embodiment therefore achieves high image quality in both resolution and quantization noise.

The bitstream generated by the color moving-image encoder in the first embodiment includes the I-, P- and B-pictures encoded as disclosed above and multiplexed with each other having headers. In detail, the luminance signal for the I- and P-pictures used as reference pictures has been encoded while scanned by progressive scanning whereas the color-difference signals for the I- and P-pictures have been encoded with the number of scanning lines thereof being decimated to one-half the progressive image signal in the vertical direction. On the contrary, the luminance and color-difference signals for the B-pictures not used as reference pictures have been encoded with the number of scanning lines thereof being decimated to one-half the progressive image signal in the vertical direction.

[First Embodiment of Decoder]

Figure 3:
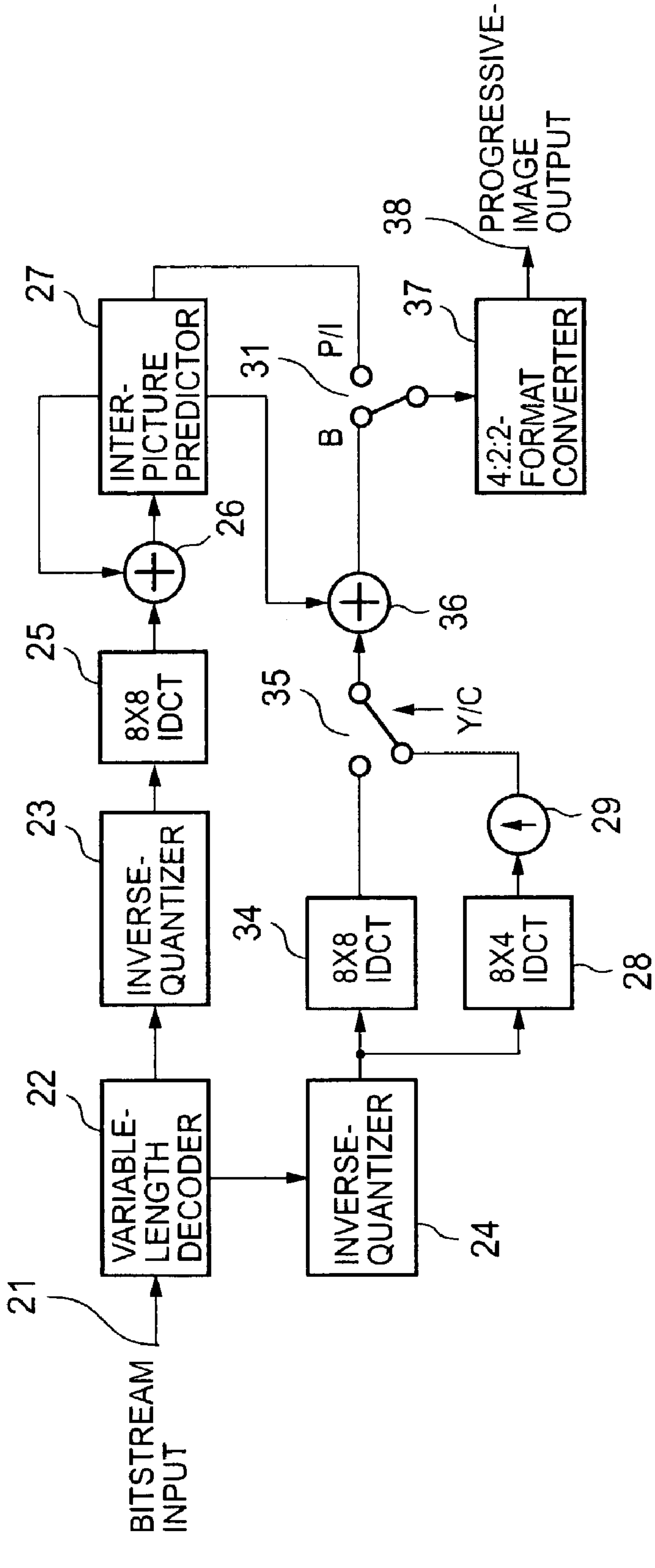
FIG. 3 shows a block diagram of a first embodiment of color moving-image decoder according to the present invention.

FIG. 3 shows a block diagram of the first embodiment of color moving-image decoder compatible with the color moving-picture encoder shown in FIG. 2.

A 4:2:0-format progressive bitstream (produced from a 4:2:2-format image), for example, transferred from the color moving-image encoder shown in FIG. 2, and supplied through a bitstream input terminal 21 is processed by a variable-length decoder 22, thus variable-length codes of the bitstream being returned to fixed-length codes.

The fixed-length codes for P(I)-pictures are supplied to an inverse-quantizer 23 while those of B-pictures are supplied to another inverse-quantizer 24.

The P(I)-picture fixed-length codes are inverse-quantized by the inverse-quantizer 23 with given quantization parameters, the resultant reproduced predictive-error DCT-coefficients being supplied to a (8×8)-IDCT 25.

The reproduced predictive-error DCT-coefficients supplied to the (8×8)-IDCT 25 are transformed into a predictive error signal. The reproduced predictive error signal is supplied to an adder 26 and added to a predictive signal from an inter-picture predictor 27, thus a P(I)-picture image signal being reproduced.

The reproduced P(I)-picture image signal is processed by the inter-picture predictor 27, the resultant predictive signal being supplied to the adder 26.

Through the variable-length decoder 22 to the inter-picture predictor 27, the P(I)-pictures are progressive signals and processed while scanned by progressive scanning and hence the reproduced picture image signal is a progressive signal.

The B-picture fixed-length codes from the variable-length decoder 22 are inverse-quantized by the inverse-quantizer 24, the resultant reproduced coefficients being supplied to a (8×4)-IDCT 28 and also a (8×8)-IDCT 34.

The (8×4)-IDCT 28 transforms the reproduced (8×4) coefficients into a predictive error signal. The reproduced predictive error signal is supplied to a scanning-line interpolator 29. Scanning lines are interpolated to the reproduced predictive error signal in the vertical direction per interlaced field, thus the predictive error signal being converted into a progressive predictive error signal. The progressive predictive error signal is supplied to a switch 35.

The (8×8)-IDCT 34 performs the same processing as the (8×8)-IDCT 25 to the reproduced coefficients of the inverse-quantizer 24, to reproduce a predictive error signal, which is also supplied to the switch 35.

The switch 35 selects the output of the scanning-line interpolator 29 for the luminance signal whereas the output of the (8×8)-IDCT 34 for the color-difference signals.

The selected predictive error signal is supplied to an adder 36 and added to the predictive signal from the inter-picture predictor 27, thus an image signal being reproduced.

The B-picture reproduced image signal, the output of the adder 36, is supplied to a 4:2:2-format converter 37 via a switch 31. The P(I)-picture reproduced image signal is delayed at an image memory of the inter-picture predictor 27 and then supplied to the 4:2:2-format converter 37 via the switch 31 when the B-picture image signal decoded later than the P(I)-picture image signal has been output to the converter 37.

The 4:2:2-format converter 37 interpolates scanning lines to the 4:2:0-format color-difference signals in the vertical direction, thus the color-difference signals being returned to 4:2:2-format signals. The obtained 4:2:2-format image signal is output through a progressive-image output terminal 38.

[Second Embodiment of Encoder]

Figure 4:
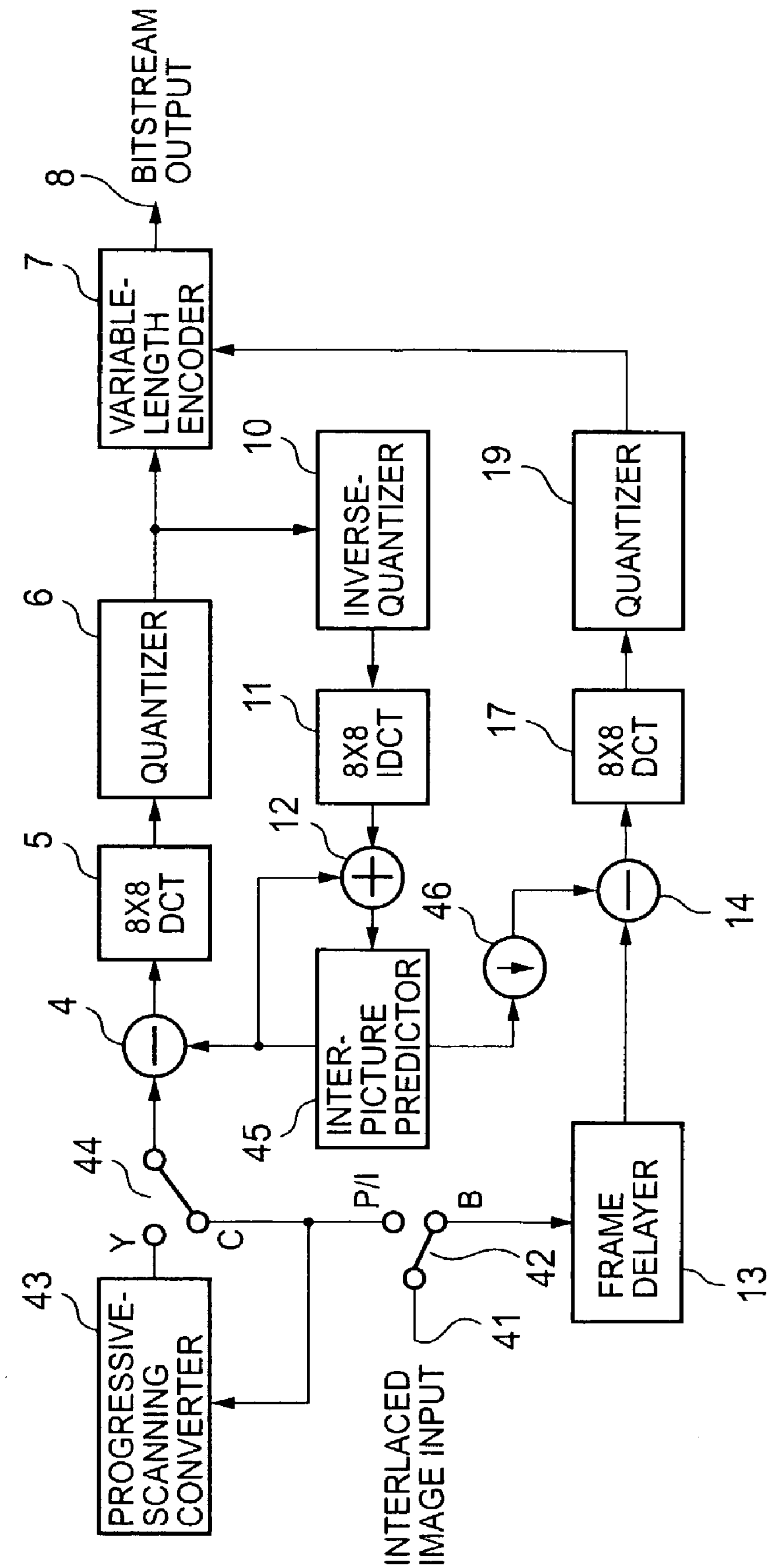
FIG. 4 shows a block diagram of a second embodiment of color moving-image encoder according to the present invention.

FIG. 4 shows a block diagram of the second embodiment of color moving-picture encoder. Elements in this embodiment that are the same as or analogous to the elements in the first embodiment shown in FIG. 2 are referenced by the same reference numerals and will not be explained in detail.

The difference between the first and second embodiments of encoder lies in production of signals to be encoded. In detail, sampling points for color-difference signals are different between the two embodiments.

In FIG. 4, a 4:2:2-format interlaced moving-image signal supplied through an interlaced-image input terminal 41 is separated, by a frame (or field) switch 42, into P(I)-picture signal components and B-picture signal components. The P (I)-picture components are supplied to a progressive-scanning converter 43 and a Y/C switch 44 whereas the B-picture components to a frame (or field) delayer 13.

The progressive-scanning converter 43 interpolates scanning lines to the P(I)-pictures from peripheral pixels thereof, the number of interpolated scanning lines corresponding to that decimated from the input signal due to interlaced scanning, thus producing a progressive-moving image signal.

The Y/C switch 44 selects the progressive output of the progressive-scanning converter 43 for the luminance signal whereas the output of the frame switch 42 for the color-difference signals.

The output of the Y/C switch 44 is thus a 4:2:0-format color moving-image signal having the progressive luminance signal and the interlaced color-difference signals.

P(I)-picture signal components of the 4:2:0-format color moving-image signal are supplied from the Y/C switch 44 to the subtractor 4, (8×8)-DCT 5 and quantizer 6, thus transformed into fixed-length codes of predictive error signal.

The output of the quantizer 6 is supplied to the inverse-quantizer 10, (8×8)-IDCT 11 and adder 12, to become a locally reproduced image which is then supplied to an inter-picture predictor 45.

The inter-picture predictor 45 is different from the counterpart 9 (FIG. 2) of the first embodiment in formation of predictive signal for the interlaced color-difference signals, which will be discussed later.

The B-picture signal components of the input 4:2:2-format interlaced moving-image signal are delayed by the frame delayer 13 while the P(I)-signal components have been encoded precedently, as disclosed above.

The delayed B-picture signal components are supplied to the subtractor 14. Also supplied to the subtractor 14 is an interlaced predictive signal from a scanning-line decimator 46, produced by decimating scanning lines of the progressive predictive signal from the inter-picture predictor 45.

The subtractor 14 applies subtraction processing to the outputs of the frame delayer 13 and the scanning-line decimator 46, thus producing a predictive error signal. The predictive error signal is supplied to the (8×8)-DCT 17 and the quantizer 19, thus transformed into fixed-length codes.

The fixed-length codes (predictive error signals) from the quantizers 6 and 19 are compressed by the variable-length encoder 7 with variable-length codes, the resultant bitstream being output (transferred) through a bitstream terminal 8.

Figure 6B:
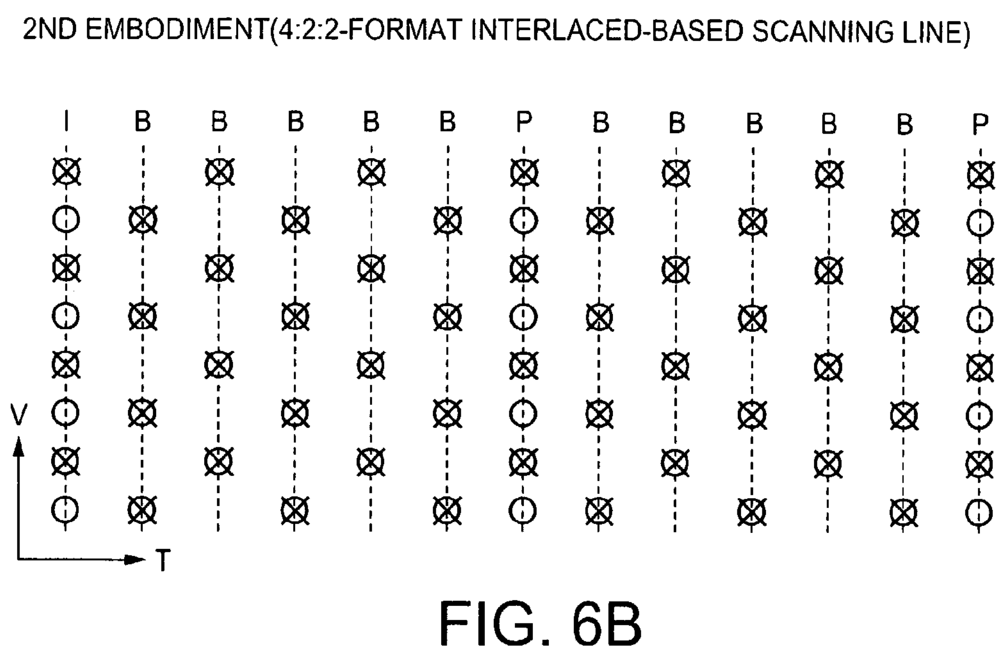

FIG. 6B illustrates the sampling points under the encoding procedure in the second embodiment described above with symbols "○" and "x" indicating luminance-signal sampling points and color-difference signal sampling points, respectively, in the vertical direction V on the time base T.

As shown, converted into a progressive signal is only the P(I)-picture luminance signal of the input 4:2:2-format interlaced image signal.

The number of scanning lines in FIG. 6B is the same as in FIG. 6A whereas the sampling points for color-difference signals are different between the first and the second embodiments. In detail, the sampling points for color-difference signals in the second embodiment are the same as those for interlaced luminance signal or 4:2:0-format progressive color-difference signals under SMPTE294M standard.

As disclosed above, P(I)-pictures used as reference pictures are encoded in progressive 4:2:0 format like the first embodiment. The number of sampled color-difference signals is thus one-half the luminance signal in both vertical and horizontal directions. Hence, like the first embodiment, the second embodiment achieves high efficiency in visual characteristics, processing amount and data amount.

On the contrary, B-pictures are encoded in interlaced-scanning 4:2:0 format in the second embodiment. The number of scanning lines of luminance and color-difference signals is thus one-half the input interlaced 4:2:2 format. Hence, the second embodiment also achieves almost no decrease in resolution of color-difference signal for interlaced-scanning reproduction, thus feasible in visual characteristics, processing amount and data amount.

[Second Embodiment of Decoder]

Figure 5:
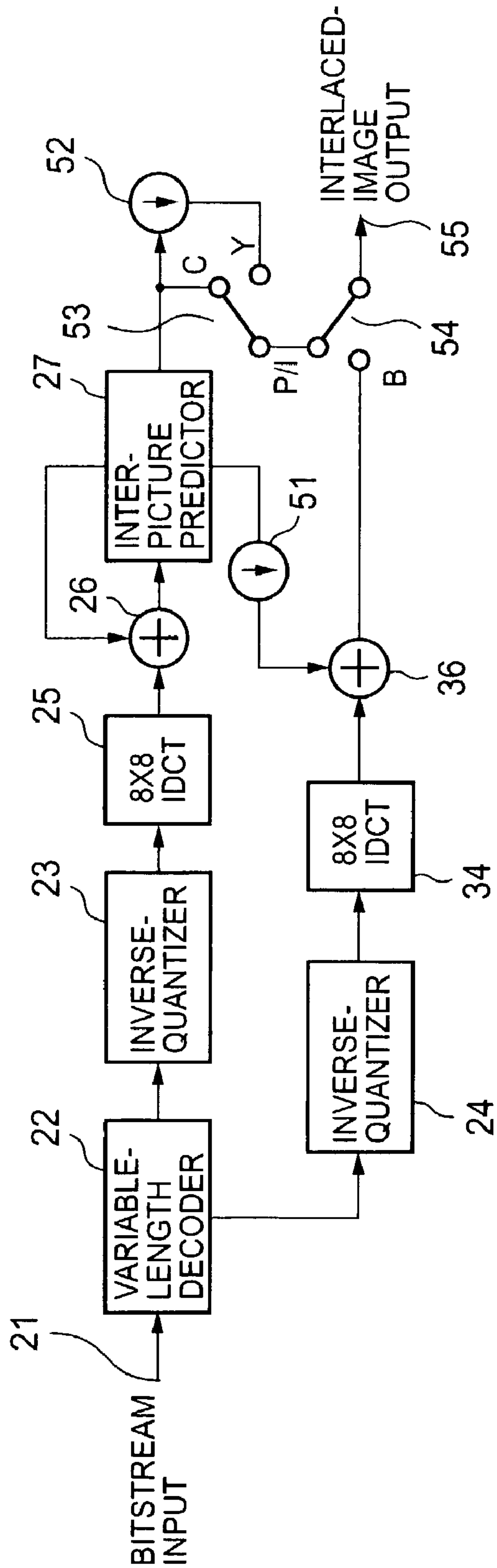
FIG. 5 shows a block diagram of a second embodiment of color moving-image decoder according to the present invention.

FIG. 5 shows a block diagram of the second embodiment of color moving-image decoder compatible with the color moving-image encoder shown in FIG. 4. Elements in this embodiment that are the same as or analogous to the elements in the first embodiment shown in FIG. 3 are referenced by the same reference numerals and will not be explained in detail.

A 4:2:0-format bitstream (produced from a 4:2:2-format image), for example, transferred from the color moving-image encoder shown in FIG. 4, and supplied through the bitstream input terminal 21 is processed by the variable-length decoder 22, thus variable-length codes of the bitstream being returned to fixed-length codes.

The fixed-length codes for P(I)-pictures are supplied to the inverse-quantizer 23 while those of B-pictures are supplied to the inverse-quantizer 24.

The P(I)-picture fixed-length codes are decoded through the inverse-quantizer 23, the (8×8)-IDCT 25 and the adder 26, the resultant reproduced P(I)-picture image signal being supplied to the inter-picture predictor 27.

The reproduced P(I)-picture image signal is processed by the inter-picture predictor 27, the resultant predictive signal being supplied to the adder 26.

Each P(I)-pictures consists of a progressive luminance signal and interlaced color-difference signals through processing by the variable-length decoder 22 to the inter-picture predictor 27.

The reproduced P(I)-picture image signal is delayed at an image memory of the inter-picture predictor 27 and then supplied to a scanning-line decimator 52 when the B-picture image signal decoded later than the P(I)-picture image signal has been output to a frame (or field) switch 54.

Scanning lines of the reproduced P(I)-picture image signal is decimated by the scanning-line decimator 52, thus an interlaced P(I)-picture image signal being produced.

The predictive signal from the inter-picture predictor 27 and the interlaced P(I)-picture image signal from the scanning-line decimator 52 are supplied to a Y/C switch 53.

The Y/C switch 53 selects the interlaced P(I)-picture image signal from the scanning-line decimator 52 for the luminance signal whereas the interlaced P(I)-picture image signal from the inter-picture predictor 27 for the color-difference signals. In other words, the Y/C switch 53 selects the interlaced P(I)-picture image signals for both the luminance and the color-difference signals.

The B-picture fixed-length codes of the variable-length decoder 22 are transformed into a predictive error signal through the processing by the inverse-quantizer 24 and the (8×8)-IDCT 34.

The predictive error signal is supplied to the adder 36 and added to the predictive signal from the inter-picture predictor 27 while scanning lines of the progressive predictive signal for the luminance signal are decimated by a scanning-line decimator 51. The resultant B-picture image signal of the adder 36 is supplied to the frame switch 54.

The frame switch 54 multiplexes the P(I)-picture image signal from the Y/C switch 53 and the B-picture image signal from the adder 36, thus outputting a 4:2:2-format interlaced moving image signal through an interlaced-image output terminal 55.

As disclosed above, according to the present invention, encoding is performed as follows: a luminance signal of an input color moving-image signal is encoded into a progressive moving-image signal whereas color-difference signals of the input image signal are encoded into moving-image signals (or encoded in a specific format) having scanning lines decimated to one-half of scanning lines of the progressive moving-image signal, for pictures (frames or fields) to be used as reference pictures in inter-picture prediction; and a luminance signal and color-difference signals of the input image signal are encoded into moving-image signals having the same number of scanning lines decimated to one-half in a spatially vertical direction, like interlaced signals, for pictures (frames or fields) not to be used as reference pictures in inter-picture prediction.

In detail, the present invention includes two types of encoding procedures for an input progressive color moving-image signal and an input interlaced color moving-image signal.

4:2:0-format conversion is applied to an input color moving-image signal, when it is a 4:2:2-format progressive signal. The resultant 4:2:0-format-converted P(i)-pictures, to be used as reference pictures in inter-picture prediction, are encoded under progressive scanning. On, the contrary, the resultant 4:2:0-format-converted B-pictures, not to be used as reference pictures, are encoded under interlaced scanning for the luminance signal thus having ½-decimated scanning lines whereas under progressive scanning for the color-difference signals having scanning lines decimated to one-half due to 4:2:0-format conversion.

When an input color moving-image signal is a 4:2:2-format interlaced signal, only the luminance signal of P(I)-pictures is converted into a progressive signal, no progressive conversion being applied to the color-difference signals of the P(I)-pictures and also the luminance and color-difference signals of B(I)-pictures. The P(I)-pictures are then encoded in 4:2:0 format under progressive scanning whereas the B-pictures are encoded in 4:2:2 format under interlaced scanning.

In other words, the features of the present invention lie in encoding the luminance signal under progressive scanning while encoding the color-difference signals in a specific format having scanning lines decimated to one-half in a spatially vertical direction, for pictures (frame or field) to be used as reference pictures in inter-picture prediction whereas encoding both the luminance and color-difference signals converted as having the same number of scanning lines in the vertical direction, for pictures not to be used as reference pictures.

The sampling points for the color-difference signals are thus one-half the luminance signal in both vertical and horizontal directions for the pictures to be used as reference pictures, which results in not so high resolution for the color-difference signals compared to the luminance signal. The present invention therefore achieves efficiency in visual characteristics, processing amount and data amount.

Moreover, encoding of both the luminance and color-difference signals converted as having the same number of scanning lines in the vertical direction, for pictures not to be used as reference pictures, in the present invention, offers high resolution to the color-difference signals in reproduction of interlaced images. Thus, the present invention further achieves efficiency in visual characteristics, processing amount and data amount, and hence provides images of high quality in resolution and quantization noise when reproduced.

Therefore, the present invention achieves decrease in encoding bit rate under the same subjective picture quality between input and output color moving-image signals.

What is claimed is:

1. A color moving-image encoding apparatus for generating a color moving-image bitstream having first pictures used as reference pictures and second pictures not used as reference pictures in inter-picture predictive encoding, the apparatus comprising:

a first encoder to encode a luminance signal of each first picture into a progressive moving-image signal whereas encode color-difference signals of the first picture into first moving-image signals having scanning lines decimated to one-half of scanning lines of the progressive moving-image signal; and a second encoder to encode a luminance signal and also color-difference signals of the second picture into second moving-image signals having scanning lines decimated to one-half of the scanning lines of the progressive moving-image signal.

2. The color moving-image encoder according to claim 1, further comprising an image-format converter to convert an input color moving-image signal into a color moving-image signal to be encoded having a progressive luminance signal and color-difference signals having scanning lines decimated to one-half of the scanning lines of the progressive moving image signal, the color moving-image signal to be encoded being supplied to the first and the second encoders.

3. The color moving-image encoding apparatus according to claim 1, each of the first and the second moving-image signals, having the scanning lines decimated to one-half of the scanning lines of the progressive moving-image signal, has an interlaced scanning-line structure.

4. A color moving-image decoding apparatus for decoding a color moving-image bitstream having first pictures used as reference pictures and second pictures not used as reference pictures in inter-picture predictive encoding, the apparatus comprising:

a first decoder to decode a luminance signal of each first picture into a progressive moving-image signal whereas decode color-difference signals of the first picture into first moving-image signals having scanning lines decimated to one-half of scanning lines of the progressive moving-image signal; and a second encoder to encode a luminance signal and also color-difference signals of the second picture into second moving-image signals having scanning lines decimated to one-half of the scanning lines of the progressive moving-image signal.

5. A color moving-image encoding method of generating a color moving-image bitstream having first pictures used as reference pictures and second pictures not used as reference pictures in inter-picture predictive encoding, comprising the steps of:

encoding a luminance signal of each first picture into a progressive moving-image signal whereas encoding color-difference signals of the first picture into first moving-image signals having scanning lines decimated to one-half of scanning lines of the progressive moving-image signal; and encoding a luminance signal and also color-difference signals of the second picture into second moving-image signals having scanning lines decimated to one-half of the scanning lines of the progressive moving-image signal.

6. A color moving-image decoding method of decoding a color moving-image bitstream having first pictures used as reference pictures and second pictures not used as reference pictures in inter-picture predictive encoding, comprising the steps of:

decoding a luminance signal of each first picture into a progressive moving-image signal whereas decoding color-difference signals of the first picture into first moving-image signals having scanning lines decimated to one-half of scanning lines of the progressive moving-image signal; and encoding a luminance signal and also color-difference signals of the second picture into second moving-image signals having scanning lines decimated to one-half of the scanning lines of the progressive moving-image signal.

7. A method of transferring a color moving-image bitstream having first pictures used as reference pictures and second pictures not used as reference pictures in inter-picture predictive encoding, comprising the step of transferring the color moving-image bitstream carrying first moving-image signals of a luminance signal of each first picture encoded into a progressive moving image signal and color-difference signals of the first picture encoded into first moving-image signals having scanning lines decimated to one-half of scanning lines of the progressive moving-image signal in a spatially vertical direction and also carrying first moving-image signals of a luminance signal and color-difference signals of the second picture encoded into second moving-image signals having scanning lines decimated to one-half of the scanning lines of the progressive moving image signal.

* * * * *